United States Patent [19]

Kamei et al.

[11] Patent Number: 5,377,012
[45] Date of Patent: Dec. 27, 1994

[54] COLOR SIGNAL PROCESSING CIRCUIT FOR A VIDEO CASSETTE RECORDER

[75] Inventors: Shinji Kamei; Yasunori Kawamura, both of Kyoto, Japan

[73] Assignee: Rohm Co., Ltd., Kyoto, Japan

[21] Appl. No.: 871,773

[22] Filed: Apr. 21, 1992

[30] Foreign Application Priority Data

Apr. 23, 1991 [JP] Japan .................................. 3-122207

[51] Int. Cl.$^5$ ................................................ H04N 9/79
[52] U.S. Cl. ..................... 358/310; 358/327; 348/571; 348/705
[58] Field of Search ............. 358/310, 327, 328, 21 R, 358/160, 181; 348/571, 607, 705; H04N 5/76, 5/782, 9/79

[56] References Cited

FOREIGN PATENT DOCUMENTS 62-208769 9/1987 Japan .
63-92183 4/1988 Japan .

*Primary Examiner*—Tommy P. Chin
*Assistant Examiner*—Khoi Truong
*Attorney, Agent, or Firm*—Nikaido, Marmelstein, Murray & Oram

[57] ABSTRACT

A color signal processing circuit for a VCR includes: an APC circuit for recording; an APC circuit for playback; a first circuit providing a color signal for recording; a second circuit providing a color signal for playback; and a switch block having a selection switch selecting one of the output signal lines of the first and second circuits to provide a color signal to the APC circuit for recording or the APC circuit for playback. In the color signal processing circuit, an emitter follower for outputting a signal are provided to each of the first and second circuits, and a switch operating in synchronization with an operation of the selection switch and providing a voltage for disabling the emitter follower of an un-selected signal line through the un-selected signal line is provided to the switch block. According to the above feature, when a signal line is selected between the signal lines by the selection switch, the un-selected signal line does not affect the other signal line and other circuits.

3 Claims, 5 Drawing Sheets

5,377,012

COLOR SIGNAL PROCESSING CIRCUIT FOR A VIDEO CASSETTE RECORDER

BACKGROUND OF THE INVENTION

1. Field of the Invention

The present invention relates to a color signal processing circuit for a VCR (video cassette recorder), and more particularly, to a color signal processing circuit which is in the form of an IC (integrated circuit).

2. Description of the Prior Art

Of color signal processing circuits, for a VCR, which is in the form of an IC, a band-pass filter of 3.58 MHz is used for both recording and playback (reproduction) systems. When a signal is inputted to the band-pass filter, an input signal is changed over by a selection switch (recording/playback changeover switch). Moreover, in the color signal processing circuit for a VCR, an input color burst is changed over by a selection switch when a color signal for recording and that for playback are provided to each automatic phase control (APC) circuit.

In FIG. 1, solid lines show a recording system, whereas alternate long and short dash lines show a playback system. Blocks 3 and 4 are used for both recording and playback. In the recording system, a color signal inputted from an input terminal 1 is provided to a gain variable amplifier 3 after passing through a band-pass filter 2 with a center frequency of 3.58 MHz via a switch 7. An output of the gain variable amplifier 3 is decreased in frequency to 629 kHz by a balanced modulation circuit 4, and thereafter, is directed to an output terminal 6 via a low pass filter 5.

In the playback system, a playback color signal inputted into an input terminal 9 is provided to the gain variable amplifier 3 after passing though a band-pass filter 10 of 629 kHz. In this case, an output of the gain variable amplifier 3 is converted into a frequency witha carier of 3.58 MHz at the balanced modulation circuit 4 on the next stage. After passing through the selection switch 7, a band-pass filter 2 of 3.58 MHz, and a comb filter 11, it is amplified by an amplifier 12, and thereafter, is directed to an output terminal 13. The color signal directed to the output terminal 13 is further directed to a Y/C mixer (not shown) connected to the output terminal 13 to be combined with a luminance signal.

In FIG. 1, the selection switch 7 is set to a contact R at the time of recording to direct a color signal from the input terminal 1 to the band-pass filter 2. At the time of playback, the selection switch 7 is changed over to a contact P to direct a color signal from the balanced modulation circuit 4 to the band-pass filter 2.

With respect to the APC, a color signal is supplied from the gain variable amplifier 3 to a REC APC circuit 14 for recording through a selection switch 8 at the time of recording. At the time of playback, a color signal is supplied from the amplifier 12 to a PB APC circuit 15 through a selection switch 8. The REC APC circuit 14 is a circuit for locking a color burst (of 3.58 MHz) of an input color signal and a variable oscillation frequency of a crystal oscillator to generate a stable signal of 629 kHz. The PB APC circuit 15 is a circuit for locking a color burst (of 3.58 MHz) of a color signal from the amplifier 12 and a fixed oscillation frequency of the crystal oscillator by varying an oscillation frequency of another voltage controlled oscillator to generate a stable signal of 3.58 MHz. Since the REC APC circuit 14 is designed to operate only at the time of recording and the PB APC circuit 15 is designed to operate only at the time of playback, no problems arise even if an output of the selection switch 8 is simultaneously provided to the two APC circuits as shown in the figure.

Now, a problem will be described with reference to FIG. 2 showing a main protion, relating to the selection switch 8, of FIG. 1. In FIG. 2, at the time of recording when the selection switch 8 is changed over to the contact R, a color signal from the gain variable amplifier 3 is supplied to the REC APC circuit 14 and the PB APC circuit 15 through the selection switch 8, whereas an output of the amplifier 12 is shut off by the selection switch 8 so as not to be coupled to the REC APC circuit 14. Moreover, at the time of playback when the selection switch is changed over to the contact P, a color signal from the amplifier 12 is supplied to the PB APC circuit 15 through the selection switch 8, and an output of the gain variable amplifier 3 is shut off by the selection switch 8 so as not to be coupled to the REC APC circuit 14 and the PB APC circuit 15.

Since an output signal line 16 of the gain variable amplifier 3 and an output signal line 17 of the amplifier 12 run long in an IC until they reach a switch block 18, problems arise that an un-selected signal line affects the other signal line and that it affects an adjacent third circuit on the way to the switch block 18. These problems are remarkable particularly in a large scale integrated circuit where signal lines are densely arranged.

To solve these problems, a method is sometimes adopted where a switch is provided to each signal block (in FIG. 2, to the gain variable amplifier 3 and the amplifier 12) so that signals are not outputted to the output signal lines of the switch blocks when a signal thereof is not used. In that case, not only each block is increased in size but also another control line is required for controlling the switch provided to each signal line. Consequently, the number of lines increases as well as degree of integration decreases, whereby the arrangement of the IC is complicated. The same problems arise with respect to a portion of the circuit relating to the selection switch 7.

SUMMARY OF THE INVENTION

An object of the present invention is to realize with a simple arrangement a color signal processing circuit for a VCR where a signal line which has not been selected by a selection switch does not affect a peripheral circuit.

To achieve the above-mentioned object, a color signal processing circuit according to the present invention is provided with: an APC circuit for recording; an APC circuit for playback; a first circuit having a signal outputting emitter follower and providing a color signal for recording; a second circuit having a signal outputting emitter follower and providing a color signal for playback; a first signal line connected to said first circuit; a second signal line connected to said second circuit; and a switch block provided with: a selection switch selecting one of said first and second signal lines to provide a color signal to said APC circuit for recording or said APC circuit for playback; and an OFF voltage supplying switch operating in response to an operation of said selection switch and providing a voltage for disabling an emitter follower connected to an un-selected one of said first and second signal lines through said un-selected signal line.

According to the above-described feature, since no signals are provided to a signal line, between a color signal providing circuit thereof and a switch block, which has not been selected by a selection switch, the other signal line or other circuits are not affected. Further, although an emitter follower which is disabled so that signals are not outputted to the un-selected signal line is arranged within the color signal providing block, the number of lines is not increased since the emitter follower is disabled by use of the un-selected signal line.

BRIEF DESCRIPTION OF THE DRAWINGS

This and other objects and features of this invention will become clear from the following description taken in conjunction with the preferred embodiments with reference to the accompanied drawings in which.

DESCRIPTION OF THE PREFERRED EMBODIMENTS

Figure 2:
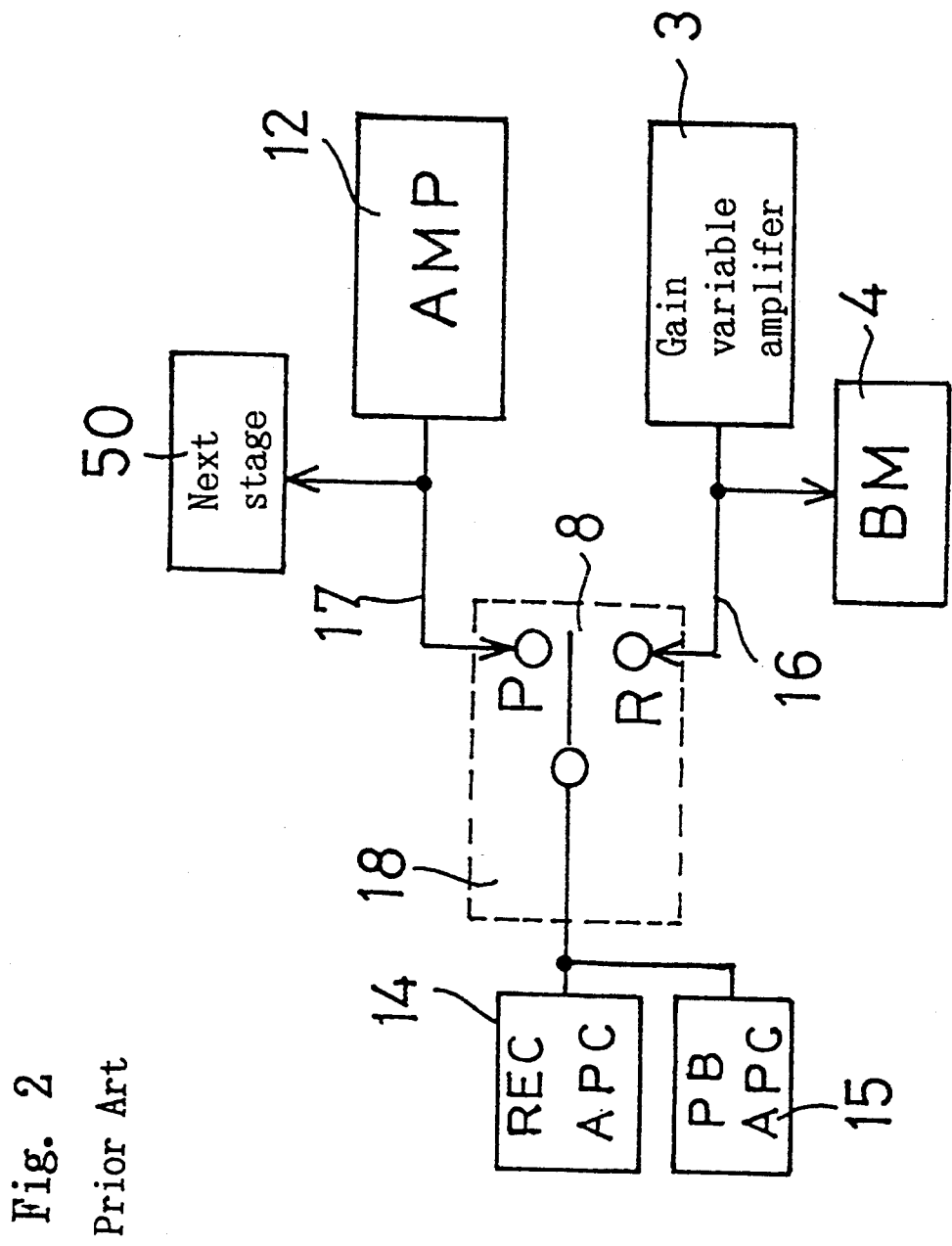
FIG. 2 is a detailed block diagram of a main portion of the circuit of FIG. 1.
Figure 3:
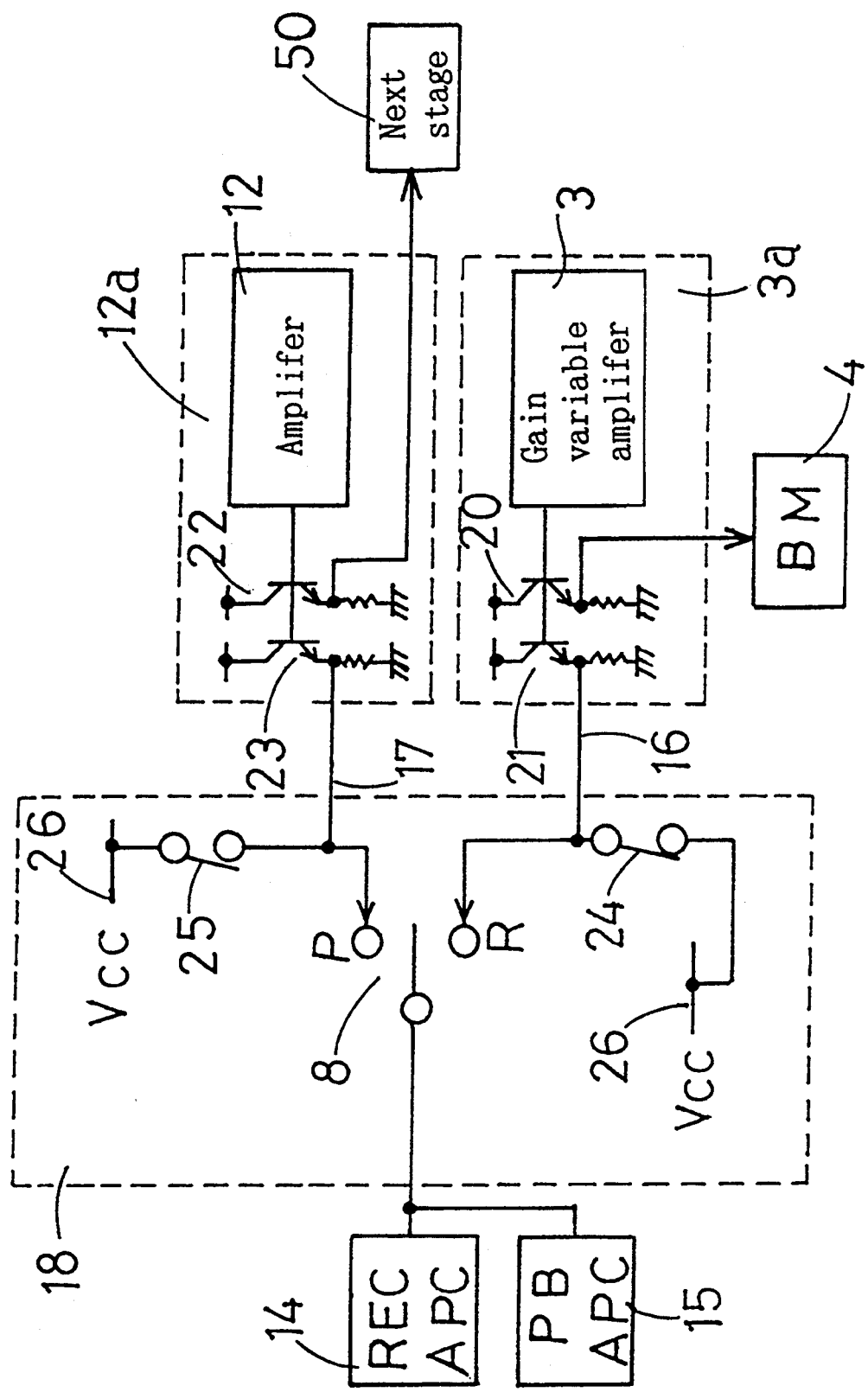
FIG. 3 is a block diagram of main portion of a signal line processing circuit, for a VCR, embodying the present invention.

In FIG. 3 showing an embodiment of the present invention, the portions the same as those of the prior art shown in FIG. 2 are represented by the same reference designations. In this embodiment, emitter followers 20 and 21 are provided on the output side of a signal block 3a including the gain variable amplifier 3. Similarly, emitter followers 22 and 23 are provided, as shown in the figure, on the output side of a signal block 12a including the amplifier 12.

The emitter follower 20 of the signal block 3a provides an output of the gain variable amplifier 3 to the balanced modulation circuit 4. The emitter follower 21 of the signal block 3a provides an output of the gain variable amplifier 3 to the contact R of the selection switch 8 in the switch block 18.

Figure 1:
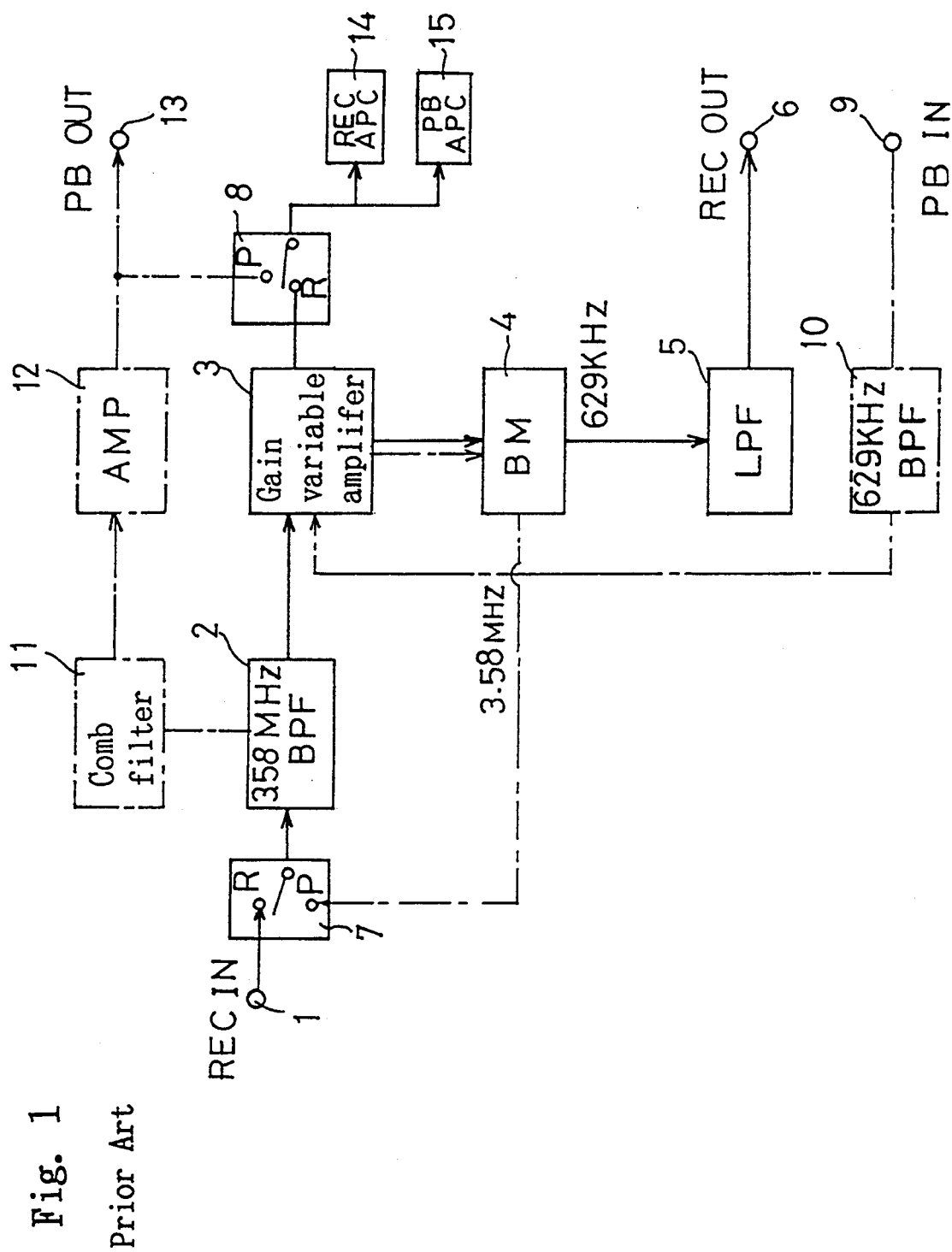
FIG. 1 a block diagram of a conventional signal line processing circuit for a VCR.

On the other hand, the emitter follower 22 of the block 12a provides a color signal amplified by the amplifier 12 to the output terminal 13 of FIG. 1 and the Y/C mixer (a block 50 on the next stage in FIG. 3) connected thereto. Moreover, the emitter follower 23 provides a color signal amplified by the amplifier 12 to the contact P of the selection switch 8 in the switch block 18.

The signal lines 16 and 17 respectively connected between the emitter followers 21 and 23, and the contacts R and P of the selection switch 8 are also connected to a power line 26 through switches 24 and 25 in the switch block 18. These switches 24 and 25 together with the selection switch 8 are controlled by a switch control section (not shown) provided in the switch block 18. The control is performed in synchronization with the above-described control of the selection switch 8.

At the time of recording, the selection switch 8 is set to the contact R, so that an output of the gain variable amplifier 3 is directed to the REC APC circuit 14. Although the switch 24 is turned off at this time, since the switch 25 is turned on, a voltage Vcc of the power line 26 is applied to the emitter of the emitter follower 23 of the block 12a through the switch 25 and the signal line 17. Because of this, the emitter follower 23 is disabled, so that no signals are outputted to the signal line 17 from the amplifier 12. At this time, the emitter follower 22 can be actuated irrelevant to the operation of the switch 25.

At the time of playback, the switch 25 is OFF and the selection switch 8 is set to the contact P, so that an output of the amplifier 12 is supplied to the PB APC circuit 15 via the signal line 17 through the switch 8. At this time, since the switch 24 is turned on to apply the voltage Vcc of power line 26 to the emitter of the emitter follower 21 of the block 3a, the emitter follower 21 is turned off, so that no signals are outputted to the signal line 16 from the gain variable amplifier 3. The emitter follower 20 remains ON since it is not influenced by the operation of the switch 24, and provides an output of the gain variable amplifier 3 to the balanced modulation circuit 4. As described above, according to the present invention, since no signals are provided from a signal block to a signal line which has not been selected by the selection switch 8 when signals are provided from the two signal blocks 3a and 12a selectively to the REC APC circuit 14 and the PB APC circuit 15, the un-selected signal line does not affect the other signal line and other circuits.

In the above-described embodiment, NPN type transistors are used for the emitter followers. When PNP type transistors are used, the circuit is designed so that the potential of the ground is provided to the emitter of the emitter follower by the switches 24 and 25.

Figure 4:
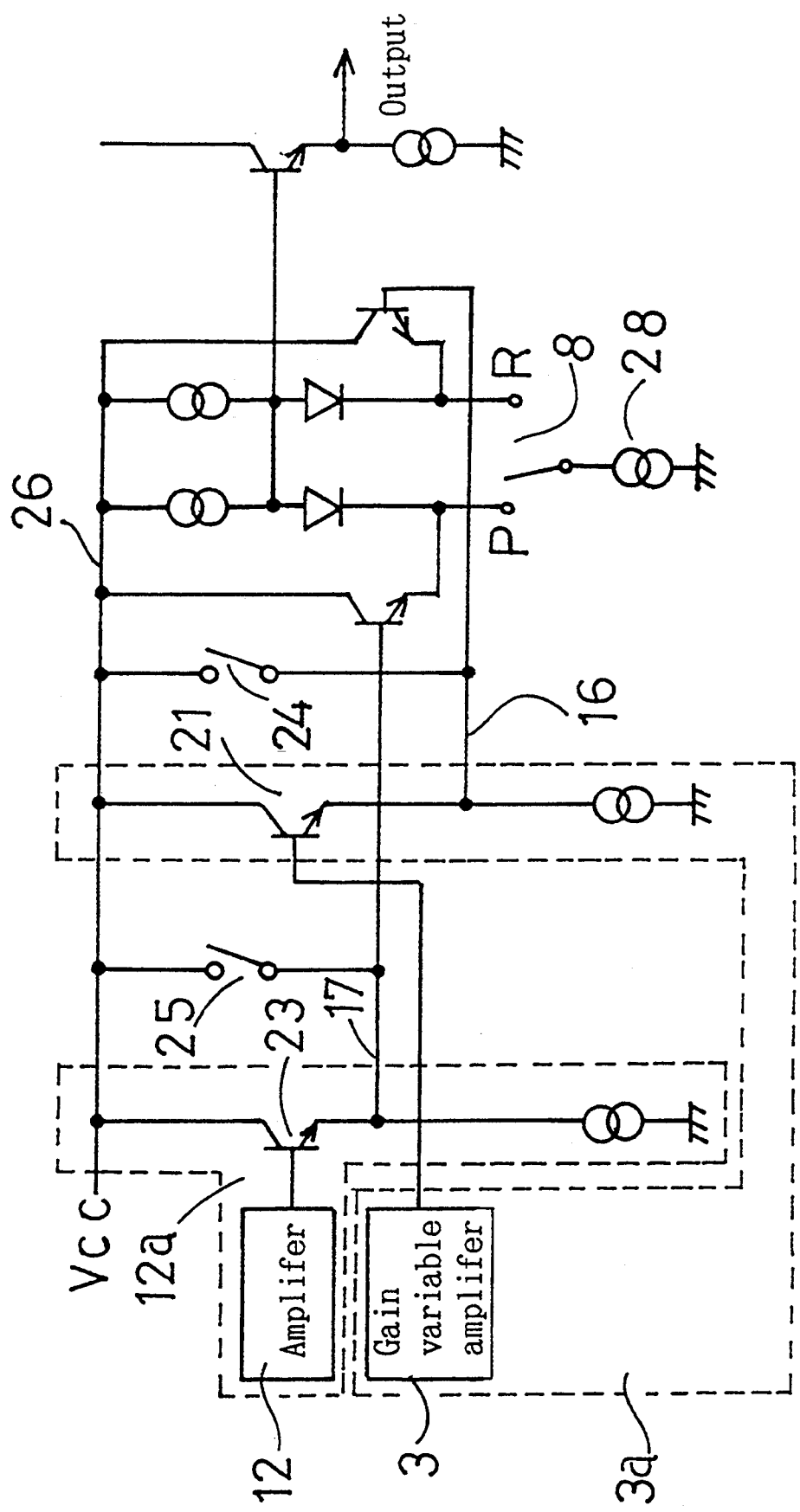
FIG. 4 is a circuit diagram specifically showing a part of the circuit of FIG. 3.

FIG. 4 shows a main portion of the circuit of FIG. 3 which is in the form of an IC. In the figure, a constant current source 28 is provided between the selection switch 8 and a ground point. The selection switch 8 connects the constant current source 28 to the contact P or R. The selection switch 8 and switches 24 and 25 actually consist of devices such as transistors.

The portion of the circuit relating to the selection switch 8 was described in the above embodiment. The portion relating to the selection switch 7 can be constructed in the same manner. Generally, a buffer circuit is connected to the REC input terminal 1 and an output of the buffer circuit is connected to the terminal R of the selection switch 7. Therefore, the emitter followers are provided to the buffer circuit. The selection switch 7 is provided to the switch block 18.

Figure 5:
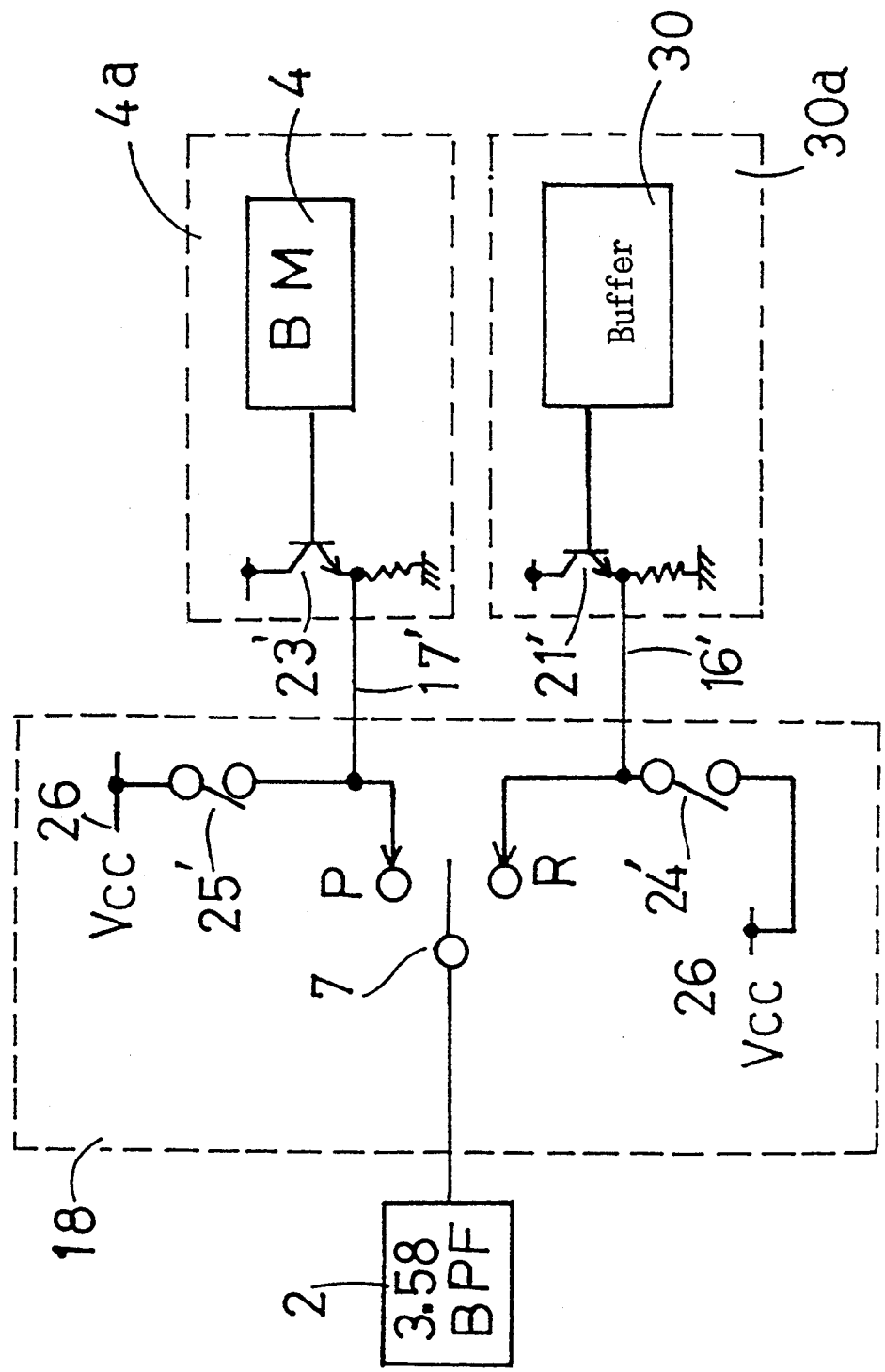
FIG. 5 is a block diagram of the main portion of another embodiment of the present invention.

FIG. 5 shows the portion of the circuit relating to the selection switch 7. In the figure, the numeral 30 represents a buffer circuit connected to the input terminal 1. The buffer circuit 30 is included in a signal block 30a. The balanced modulation circuit 4 is included in a signal block 4a. To the signal blocks 30a and 4a, emitter followers 21' and 23' are provided as shown in the figure. Output signal lines 16' and 17' thereof are connected to the contacts P and R of the selection switch 7, respectively. Switches 24' and 25' correspond to the switches 24 and 25 of FIG. 3, respectively, and have functions the same as those of the switches 24 and 25.

Obviously, many modifications and variations of the present invention are possible in light of the above teachings. It is therefore to be understood that within the scope of the appended claims, the invention may be practiced other than as specifically described.

What is claimed is:

1. A color signal processing circuit comprising:
   an APC circuit for recording;
   an APC circuit for playback;

a first circuit having a first signal outputting emitter follower, said first signal outputting emitter follower outputting a first color signal for recording;

a second circuit having a second signal outputting emitter follower, said second signal outputting emitter follower outputting a second color signal for playback;

a first signal line connected to said first circuit;

a second signal line connected to said second circuit; and a switch block provided with a selection switch selecting one of said first and second signal lines to provide a color signal to said APC circuit for recording or said APC circuit for playback and an OFF voltage supplying switch operating in synchronization with an operation of said selection switch and providing a voltage for disabling an emitter follower connected to an un-selected signal line of said first and second signal lines through said un-selected signal line.

2. A color signal processing circuit according to claim 1, wherein said first circuit comprises a gain variable amplifier circuit and two emitter followers, wherein one emitter follower is connected to said first signal line and the other emitter follower is connected to a balanced-modulation circuit, and wherein said the other emitter follower is not disabled by said OFF voltage supplying switch.

3. A color signal processing circuit comprising:

a band-pass filter used for both recording and playback;

a first circuit having a first signal outputting emitter follower and providing a first color signal for recording;

a second circuit having a second signal outputting emitter follower and providing a second color signal for playback;

a first signal line connected to said first circuit;

a second signal line connected to said second circuit; and a switch block provided with a selection switch selecting one of said first and second signal lines to provide a color signal to said band-pass filter and an OFF voltage supplying switch operating in synchronization with an operation of said selection switch and providing a voltage for disabling an emitter follower connected to an un-selected signal line of said first and second signal lines through said un-selected signal line.

* * * * *